(12) United States Patent
Varner (10) Patent No.: US 11,852,503 B1
(45) Date of Patent: Dec. 26, 2023

(54) ILLUMINATED LEVEL

(71) Applicant: Andrew Neil Varner, Cleveland, OH (US)

(72) Inventor: Andrew Neil Varner, Cleveland, OH (US)

(*) Notice: Subject to any disclaimer, the term of this patent is extended or adjusted under 35 U.S.C. 154(b) by 572 days.

(21) Appl. No.: 16/857,251

(22) Filed: Apr. 24, 2020

Related U.S. Application Data

(60) Provisional application No. 62/920,313, filed on Apr. 24, 2019.

(51) Int. Cl.
*G01C 9/06* (2006.01)
*G01C 9/34* (2006.01)
*G01P 15/18* (2013.01)
*G01D 5/14* (2006.01)

(52) U.S. Cl.
CPC ............. *G01C 9/06* (2013.01); *G01C 9/34* (2013.01); *G01D 5/145* (2013.01); *G01P 15/18* (2013.01); *G01C 2009/066* (2013.01)

(58) Field of Classification Search
None
See application file for complete search history.

(56) References Cited

U.S. PATENT DOCUMENTS

| | | | | | |
|---|---|---|---|---|---|
| 2,728,989 | A * | 1/1956 | Laggren | ................... | G01B 3/56 |
| | | | | | 33/339 |
| 6,836,972 | B2 * | 1/2005 | Drahos | ................... | G01C 9/06 |
| | | | | | 33/366.11 |
| 2016/0138916 | A1 * | 5/2016 | Neitzell | ................... | G01C 9/32 |
| | | | | | 33/379 |
| 2020/0064132 | A1 * | 2/2020 | Schubert | ................. | G01C 9/28 |

* cited by examiner

*Primary Examiner* — Adolf Dsouza
(74) *Attorney, Agent, or Firm* — GUGLIOTTA & GUGLIOTTA LPA (57) ABSTRACT

A spirit level is provided that incorporates an illuminated optical indicator of the level orientation. The spirit level housing is at least partially translucent. At least one light-emitting diode (LED) is disposed within the housing for illuminating the translucent portions of the housing. Vertical, horizontal and angular orientation indication assemblies are provided including a tubular curved glass vial having a constant inner diameter at a viewing point and having a slight upward curve and incompletely filled with a liquid to create a bubble. An angle sensing circuit electrically connected to a battery controls the LED's to illuminate in a first color in a vertical orientation and in a second color in a horizontal orientation. Gradual changing of the color and/or the intensity of the light occurs during transition of the orientation between the vertical orientation and the horizontal orientation.

20 Claims, 8 Drawing Sheets

ILLUMINATED LEVEL

RELATED APPLICATIONS

The present invention claim benefit of U.S. Provisional Application 62/920,313, filed on Apr. 24, 2019 and incorporated by reference as if fully rewritten herein.

BACKGROUND OF THE INVENTION

1. Field of the Invention

The present invention relates generally to a spirit level and, more particularly, to an improved spirit level that includes an illuminated optical indicator of the level orientation.

2. Description of the Related Art

Levels have been used in the construction and carpentry industries for many years and are provided in a variety of styles, including hand-held beam levels, string levels, torpedo levels, fish eye levels, and water levels. The spirit level, bubble level or simply a level is an instrument designed to indicate generally whether a surface is horizontal (level) or vertical (plumb). Different types of spirit levels may be used by carpenters, stonemasons, bricklayers, other building trades workers, surveyors, millwrights and other metalworkers, and in some photographic or videographic work. Such hand held spirit levels commonly used level in construction and carpentry in that it is effective, lightweight, durable, easy to use and affordable.

Many construction projects require proper alignment of various components in relation to a ground surface. Such practice allows for proper construction of necessarily level surfaces such as floors and the like and helps to maintain relative alignment between various portions of the construction. Levels are the most common tools utilized for such applications. In general, such leveling devices utilize a gravity-based sight mechanism to ensure that a desired surface is perpendicular or otherwise properly aligned in relation to the downward pull of gravity.

Some examples of use of the hand-held beam level include leveling concrete, laying foundations, laying tile, hanging doors, installing shelves, mounting cabinets, installing counter tops and many other building and installation projects.

One disadvantage of the hand held beam style level is that it is difficult to read in low light conditions and/or at difficult angles in relation to the user, both of which situation are common at construction sites.

Digital levels are increasingly common in replacing conventional spirit levels, particularly in civil engineering applications such as traditional building construction and steel structure erection, for on-site angle alignment and leveling tasks. The industry practitioners often refer to those leveling tools as a "construction level", "heavy duty level", "inclinometer", or "protractor". These modern electronic levels are (i) capable of displaying precise numeric angles within 3600 with 0.1° to 0.05° accuracies, (ii) digital readings can be read from a distance with clarity, (iii) affordable in priced due to mass adoption. They provide features that traditional levels are unable to match. Typically, these features enable steel beam frames under construction to be precisely aligned and leveled to the required orientation, which is vital to ensure the stability, strength and rigidity of steel structures on sites. Digital levels, embedded with angular MEMS technology effectively improve productivity and quality of many modern civil structures. Some recent models feature waterproof IP65 and impact resistance features for harsh working environments.

Levels are typically used in the construction industry to determine an angular orientation of a surface against which the level is placed. Such levels typically include bubble/spirit vials that are oriented at predetermined angles relative to the level's reference surfaces (e.g., 0 degrees, 45 degrees, 90 degrees, etc.). A primary disadvantage of such devices is that due to the sight-based nature of the levelness indicators, proper and accurate assessment of the level by a user's eyesight is required. Such conditions require the user to be able to accurately assess the level's readings in order to ensure proper construction. In addition to requiring training and skill on the part of the user, such readings are made difficult and potentially inaccurate by environmental factors which limit visibility such as shadows, low-light situations, and the like. Such factors are particularly prevalent on construction sites due to the transitory nature of the construction which often precludes the presence of proper lighting and visibility.

Traditionally, to improve levels' usefulness in such dimly lit environments, light sources have been used inside a level to illuminate the inside of a level's bubble vial. However, this solution does not adequately address the issue.

Consequently, a need has been felt for and improvement to a spirit level that includes an illuminated optical indicator of the level's orientation.

SUMMARY OF THE INVENTION

It is thus an object of the present invention to provide an improved spirit or bubble type level.

It is a feature of the present invention to provide an illuminated optical indicator of the level's orientation during operation.

The present invention provides an improved spirit level is provided that incorporates an illuminated optical indicator of the level orientation. The spirit level housing is at least partially translucent. At least one light-emitting diode (LED) is disposed within the housing for illuminating the translucent portions of the housing. Vertical, horizontal and angular orientation indication assemblies are provided including a tubular curved glass vial having a constant inner diameter at a viewing point and having a slight upward curve and incompletely filled with a liquid to create a bubble. An angle sensing circuit electrically connected to a battery controls the LED's to illuminate in a first color in a vertical orientation and in a second color in a horizontal orientation. Gradual changing of the color and/or the intensity of the light occurs during transition of the orientation between the vertical orientation and the horizontal orientation. The use of a strobing effect, with variations in the speed of strobing, may further be used in lieu of or in addition to changes in color or intensity.

According to another aspect of the present invention, a level is provided including an otherwise conventional frame supporting one or more bubble levels. The battery compartment encloses a PCB with LED's and a rotational hall sensor. An eccentric mass is retained by a radial magnet within a rotational cavity and between a pair of low friction spacers. Such an aspect of the present invention performs the equivalent functions but utilizes the balancing of an eccentric mass containing a radially magnetized magnet over top of a rotational Hall sensing chip that provides incremental outputs, serially, using internal Hall sensor and filtering blocks at intervals of the desired incremental output. By reading the position of the mass the orientation of the frame may be determined relatively and thereby functionally operate the LED's as indicated herein below.

In addition to the traditional bubble-level operation, the present invention includes an illuminated optical indicator that enhances indication of the level orientation.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to FIG. 1 through FIG. 5, wherein like reference numerals indicate the same parts throughout the several views, a spirit or bubble type level, generally noted as 10, is shown according to the preferred embodiment of the present invention. The level 10 is formed as a linearly elongated housing 12 of a level hand tool. As should be understood by those having ordinary skill in the relevant art, in light of the present teachings, that the housing 12 shown herein may be of a different form factor such as in the form of a carpenter's level or a torpedo level or any other similar or functionally equivalent hand tool, while still being within the scope of the intended invention. As such the mere form factor of the housing 12 should in no way be interpreted as limiting. In the configuration shown, the housing 12 of level 10 may have any appropriate dimensions, such as a length with a range between 9 inches and 16 inches, a height with a range between 1 inches and 2 inches, and a depth with a range between 0.5 inches and 2 inches.

The housing 12 may further include and support one or more orientation indicator. As shown in the present example, a vertical orientation indicator 20 may be provided at or near one terminus of the housing 12. Further, a horizontal orientation indicator 22 may be provided along one lateral edge 16 of the housing 12. Further still, an angular orientation indicator 24 may also be provided at or near a second terminus of the housing 12, opposite the vertical orientation indicator 20.

Each of the orientation indicators 20, 22, 24 may be formed in an otherwise conventional manner such as to provide a tubular curved glass vial 26. Each slightly curved glass vial 26 may be provided having a constant inner diameter at each viewing point. Each vial 26 may further be incompletely filled with a liquid 27, such as a colored spirit or alcohol, leaving a bubble 28 within the tube 26. By having a slight upward curve the bubble 28 will naturally rest in the center, the highest point of the tube 26. At slight inclinations the bubble 28 travels away from the marked center position. In a functionally similar and equivalent configuration, the curved constant-diameter tube 26 may be replaced by an uncurved barrel-shaped tube with a slightly larger diameter in its middle.

While the liquid 27 may comprise water, the use of an alcohol such as ethanol may be used instead. Such a use of an alcohol will have low viscosity and surface tension, thereby allowing the bubble 28 to travel the tube 26 quickly and settle accurately with minimal interference from the glass surface.

Further, a colorant such as fluorescein, typically yellow or green, may be added to increase the visibility of the bubble 26.

The vertical orientation indicator 20 may be provided such that the tube 26 is generally perpendicular to the elongated centerline of the housing 12. Such an orientation allows for centering of this bubble 28 when the edge 16 is oriented vertically. The horizontal orientation indicator 22 may be provided such that the tube 26 is generally parallel to the elongated centerline of the housing 12. Such an orientation allows for centering of this bubble 28 when the edge 16 is oriented horizontally.

The angular orientation indicator 24 may be provided such that the tube 26 is generally positioned at a designated angle to the elongated centerline of the housing 12. Such an orientation allows for centering of the bubble 28 when the edge 26 is oriented at that designated angle. Such a designated angle may be a commonly used angle within the building trades, such as a 45° angle. The angular orientation indicator 24 may further be provided within a rotatably adjustable insert 40 capable of incremental rotation about a selected range of angles relative to the elongated centerline. Further still, the insert 40 may include a directional indicator 42 to work in conjunction with a plurality of radially aligned angular indicia 44 about at least an arc portion of the insert's perimeter. By providing a ratchet mechanism or similar incremental rotation mechanism the angular orientation indicator 24 may be selectively oriented to a different angle on an as need basis.

The housing 12 may further be adapted so as to contain the necessary components to illuminate the level 10, notably light-emitting diode (LED) bulbs 50, an accelerometer 52, a microprocessor 54, and a power source 56.

The housing 12 of level will optimally be constructed of a translucent plastic to properly disperse light throughout the device. However, any desired and appropriate materials may be utilized, both for the housing 12, and the components disposed therein.

The level 10 is further primarily designed to provide a spectrum of various lights when utilizing the level 10. In general terms, the color of the lighting that illuminates level 10 varies based on the orientation of the level. For example, in a vertical orientation (i.e., elongated centerline collinear with vertical), the level 10 may be illuminated in a first color. Then, when the level 10 is in a horizontal position, the level 10 may be illuminated in a second color. As the orientation of the level 10 changes, the color of the lighting may gradually change, either in intensity or in color. When the level 10 is in off mode, the LED bulbs 50 therein are not illuminated.

The LED bulbs 50 may be securely mounted within the housing 12, and preferably operationally connected to the microprocessor 54. The motion sensor 52 senses the orientation of the housing 14, and directs a signal, through the microprocessor 54. The microprocessor 54 relays an operating signal to the LED bulbs 50 to illuminate a particular color and intensity of illumination, depending on the signal originating within the motion sensor 52. All of the LED bulbs 50 will illuminate, causing the entire housing 12 to dispel light, while the orientation of the housing dictates the color and/or intensity of the light.

The accelerometer 52 measures the force due to gravity in order to determine the tilt of the object relative to the ground. The orientation of the housing may be detected by measurement of acceleration forces in three dimensions. The accelerometer has springs that are calibrated with a specific weight, or mechanical resistance such that movement changes the pressure on these springs. The microprocessor 56 processes this change in pressure and translates it into a meaningful change in space or orientation.

It must be noted that any desired settings may be entered into the microprocessor 54, such as the LED bulbs 50 strobing when the level 10 is in a perfectly horizontal or vertical position. Alternatively, the microprocessor 54 may be set to automatically power down the level 10 when not operational for a specified time period.

The power source 56 is typically one or more batteries, which provide the power to enable functionality of the components of the level 10.

Preferably, the level 10 will be in "ON" mode when the motion sensor 52 senses movement. However, it is within the terms of the embodiment that there be an "ON/OFF" switch (60) located on the housing 12.

Referring now in conjunction with FIG. 6 through FIG. 9, a spirit or bubble type level, generally noted as 100, is shown according to a first alternate embodiment of the present invention. The level 100 includes an otherwise conventional frame 104 supporting one or more bubble levels 103. The battery compartment 108 encloses a PCB with LED's and a rotational hall sensor 102. An eccentric mass 107 is retained by a radial magnet 106 within a rotational cavity 110 and between a pair of low friction spacers 105. As shown best in conjunction with FIG. 8, the alternate embodiment performs the equivalent functions but utilizing the balancing of an eccentric mass containing a radially magnetized magnet over top of a rotational Hall sensing chip that provides incremental outputs, serially, using internal Hall sensor and filtering blocks at intervals of the desired incremental output. By reading the position of the mass the orientation of the frame may be determined relatively and thereby functionally operate the LED's as indicated herein below.

In either embodiment, the inclusion of a calibration mechanism is envisioned as being included in order to calibrate the sensors and angular position for accuracy of determining angular location.

2. Operation of the Preferred Embodiment

Figure 1:
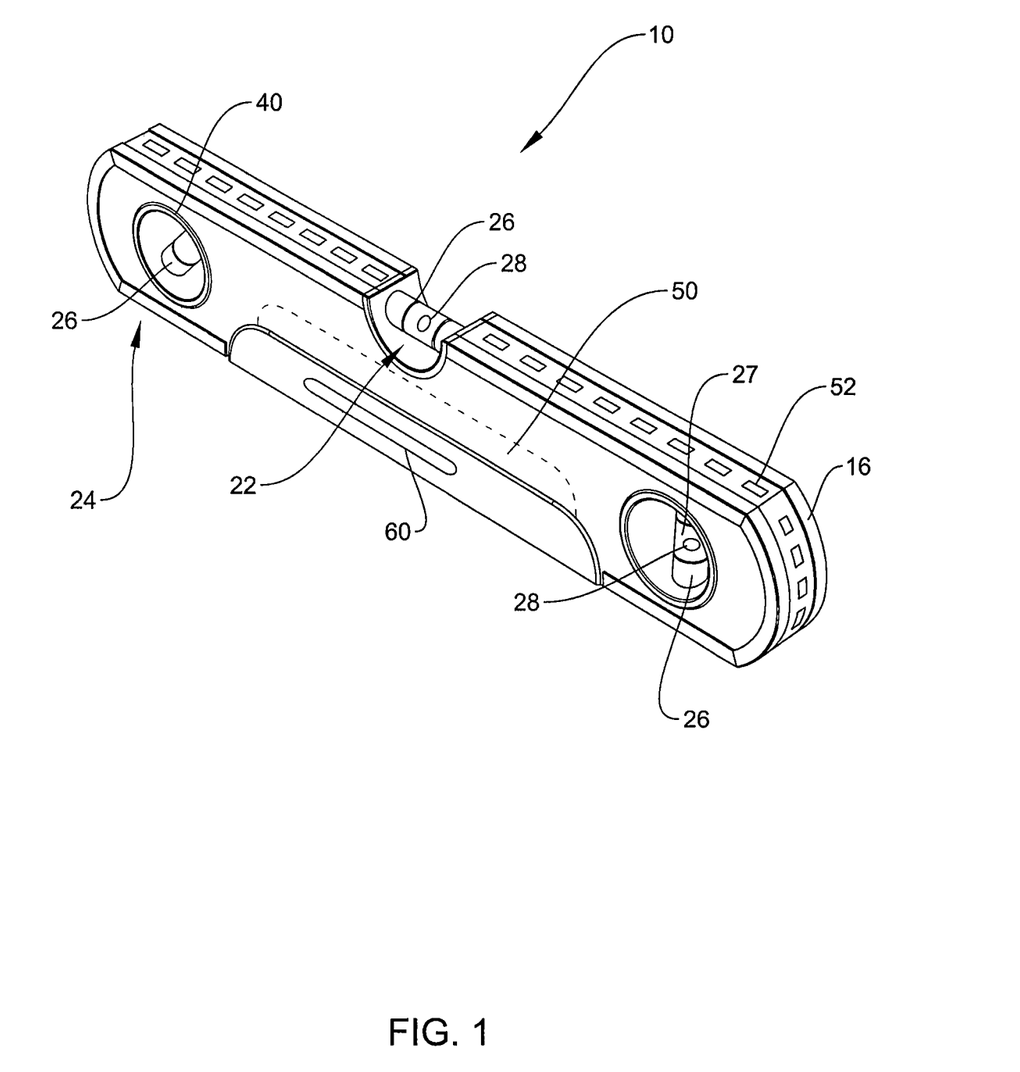
FIG. 1 is a front perspective view of an improved illuminated level in accordance with the preferred embodiment of the present invention.
Figure 2:
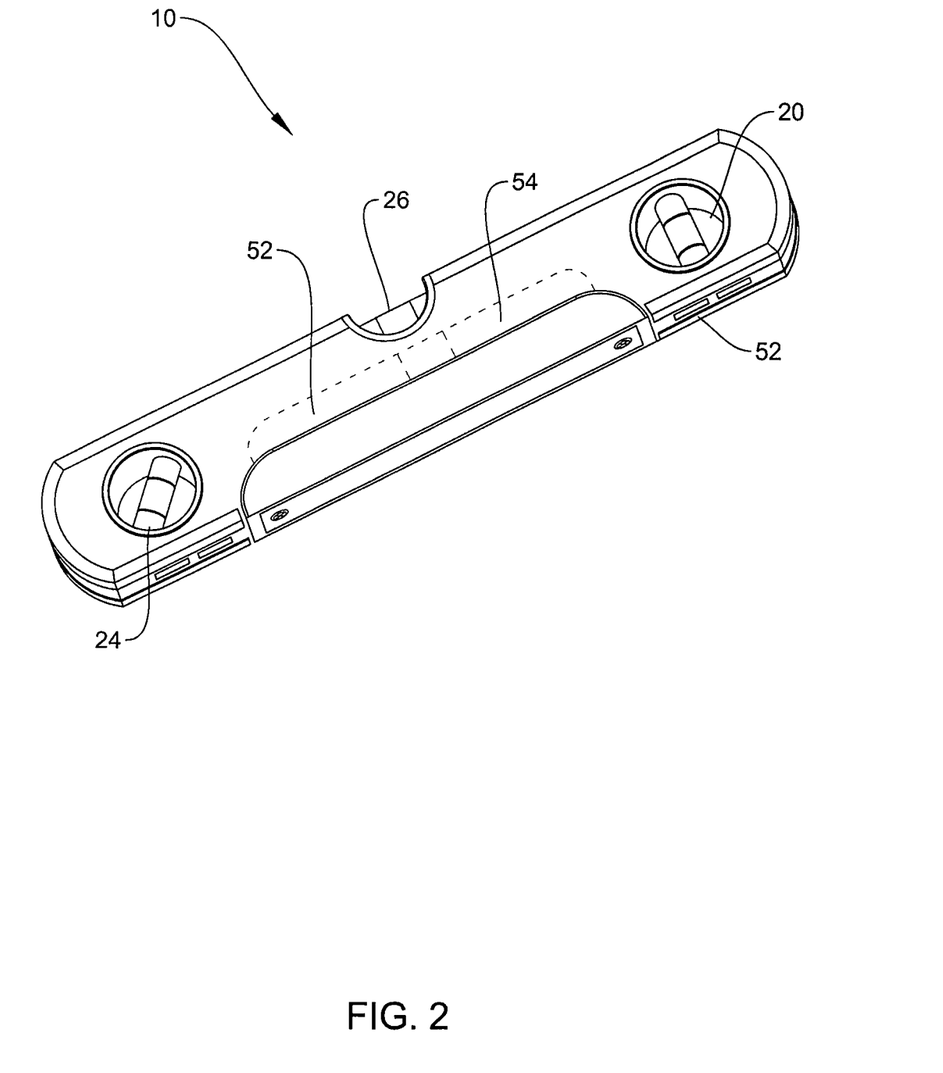
FIG. 2 is a rear perspective view thereof.
Figure 3:
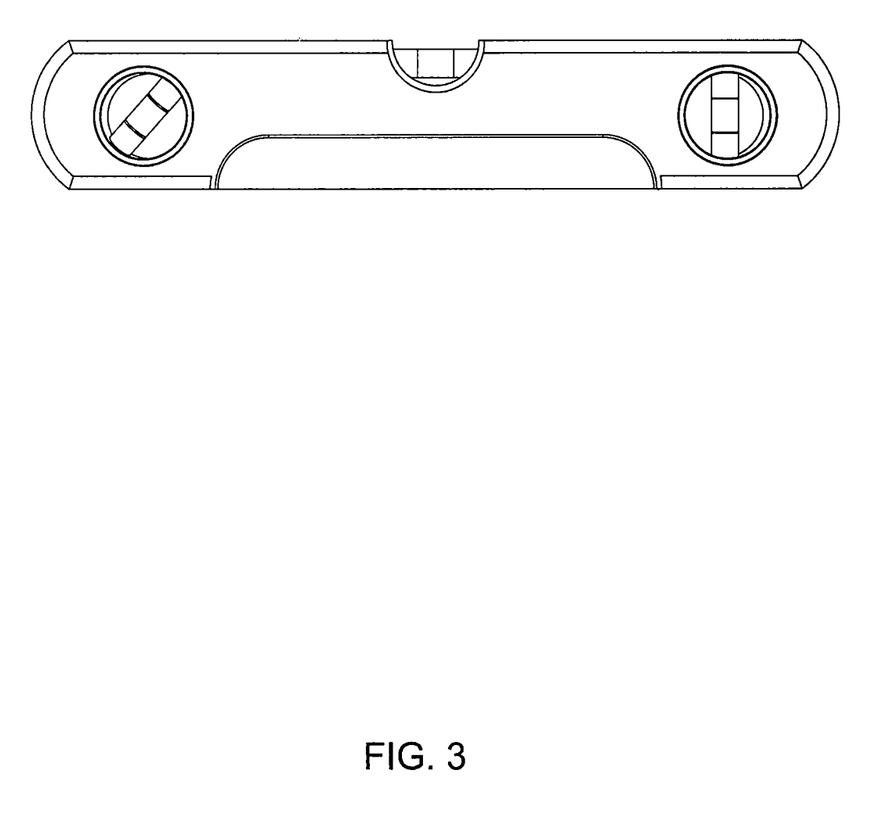
FIG. 3 is a side elevational view thereof.
Figure 4:
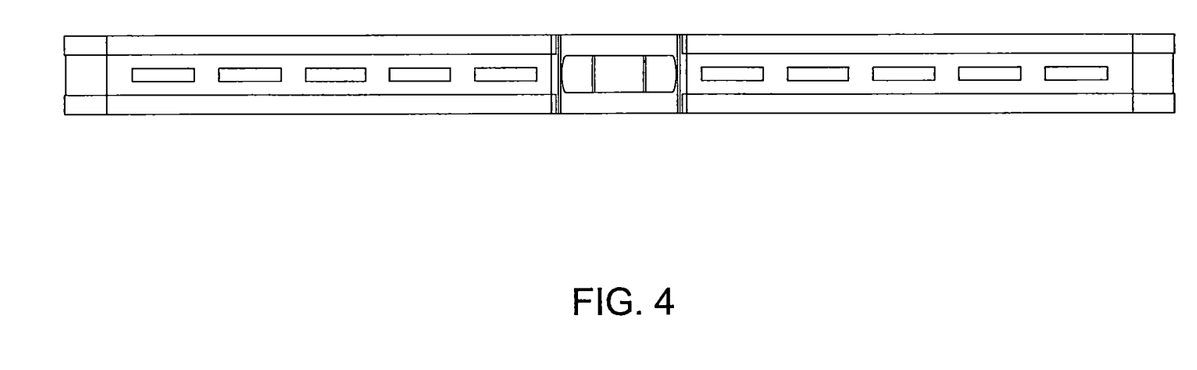
FIG. 4 is a top plan view thereof.
Figure 5:
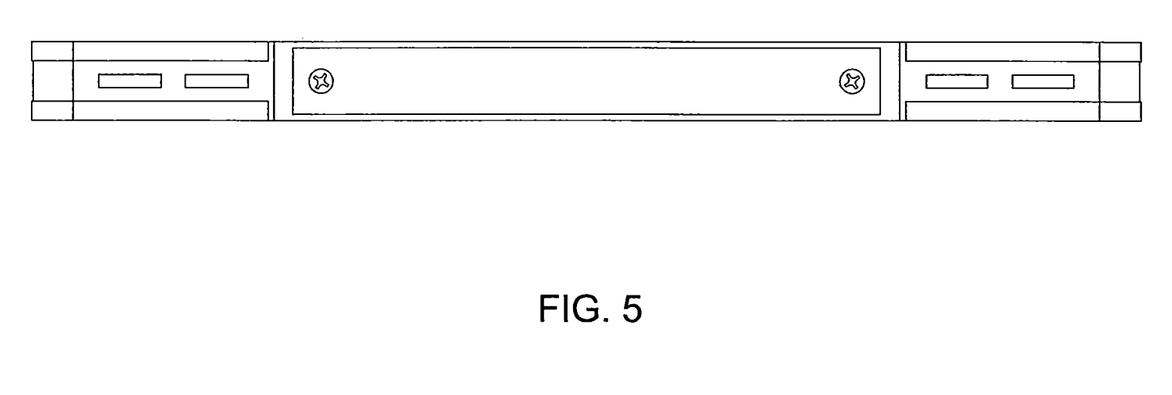
FIG. 5 is a bottom plan view thereof.
Figures 6, 7:
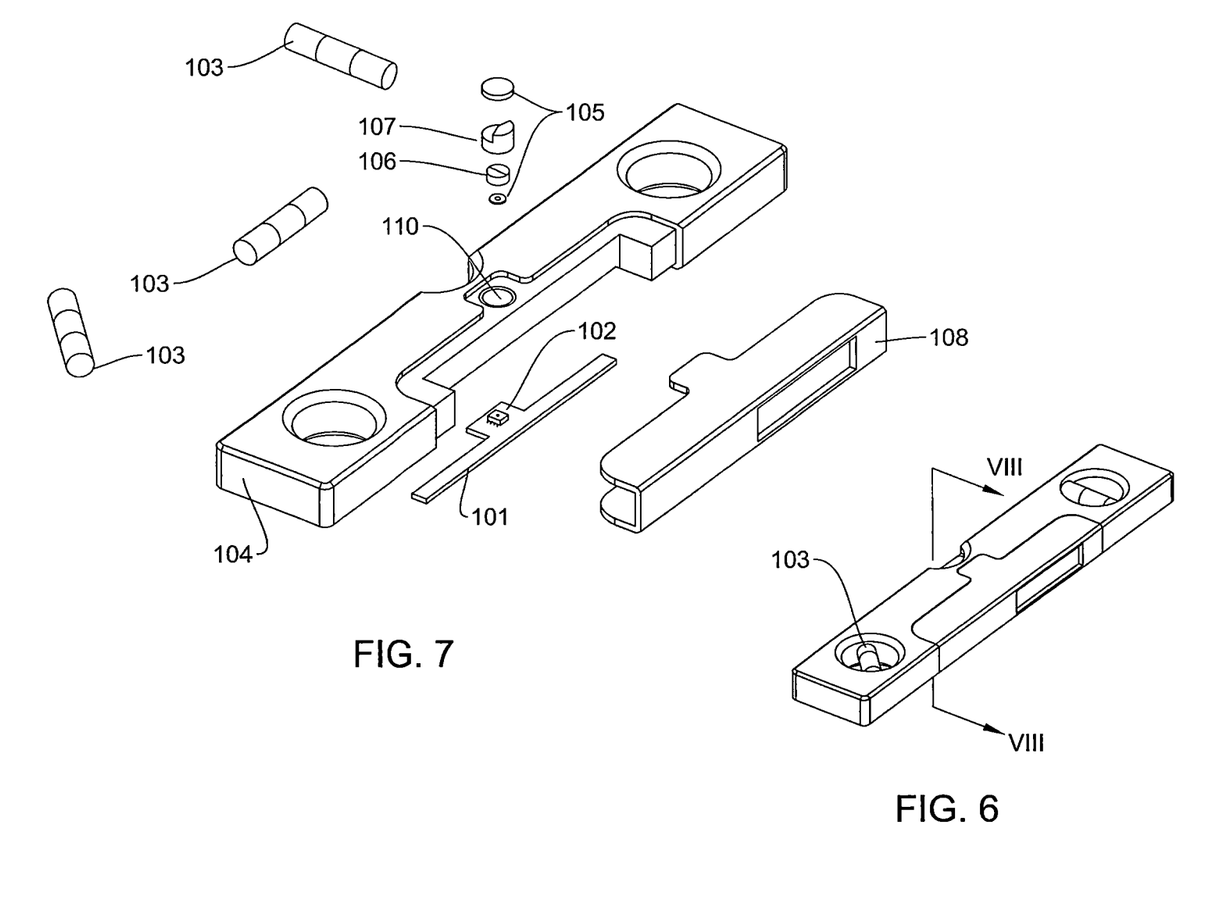
FIG. 6 is a top perspective view of an improved illuminated level in accordance with a first alternate embodiment of the present invention.
FIG. 7 is an exploded perspective view thereof.
Figure 8:
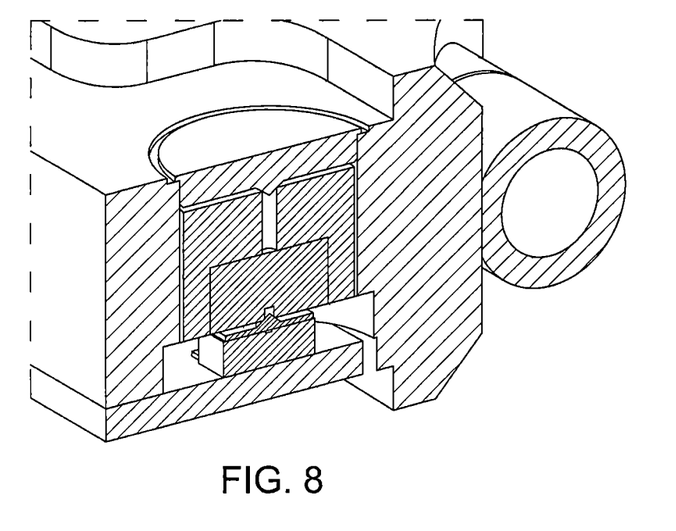
FIG. 8 is a cross sectional view taken along line VIII-VIII of FIG. 6.
Figure 9:
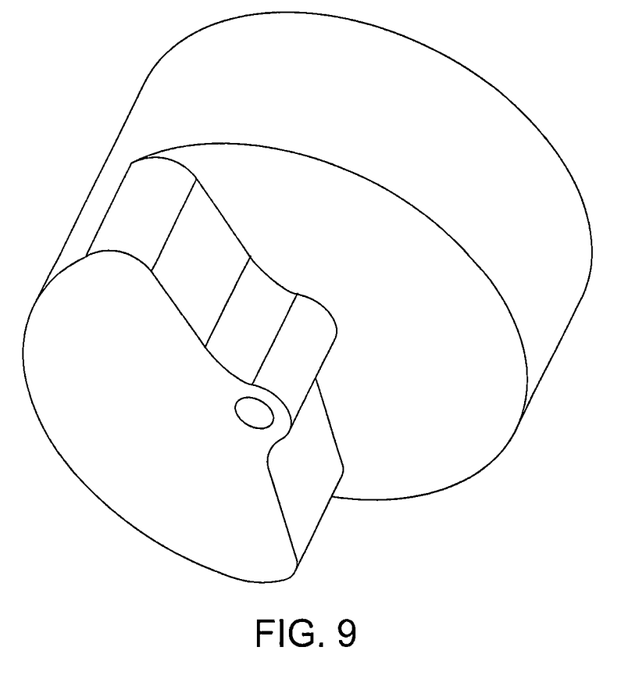
FIG. 9 is a detailed perspective view of the eccentric mass 107 and radial magnet 106.
Figure 10:
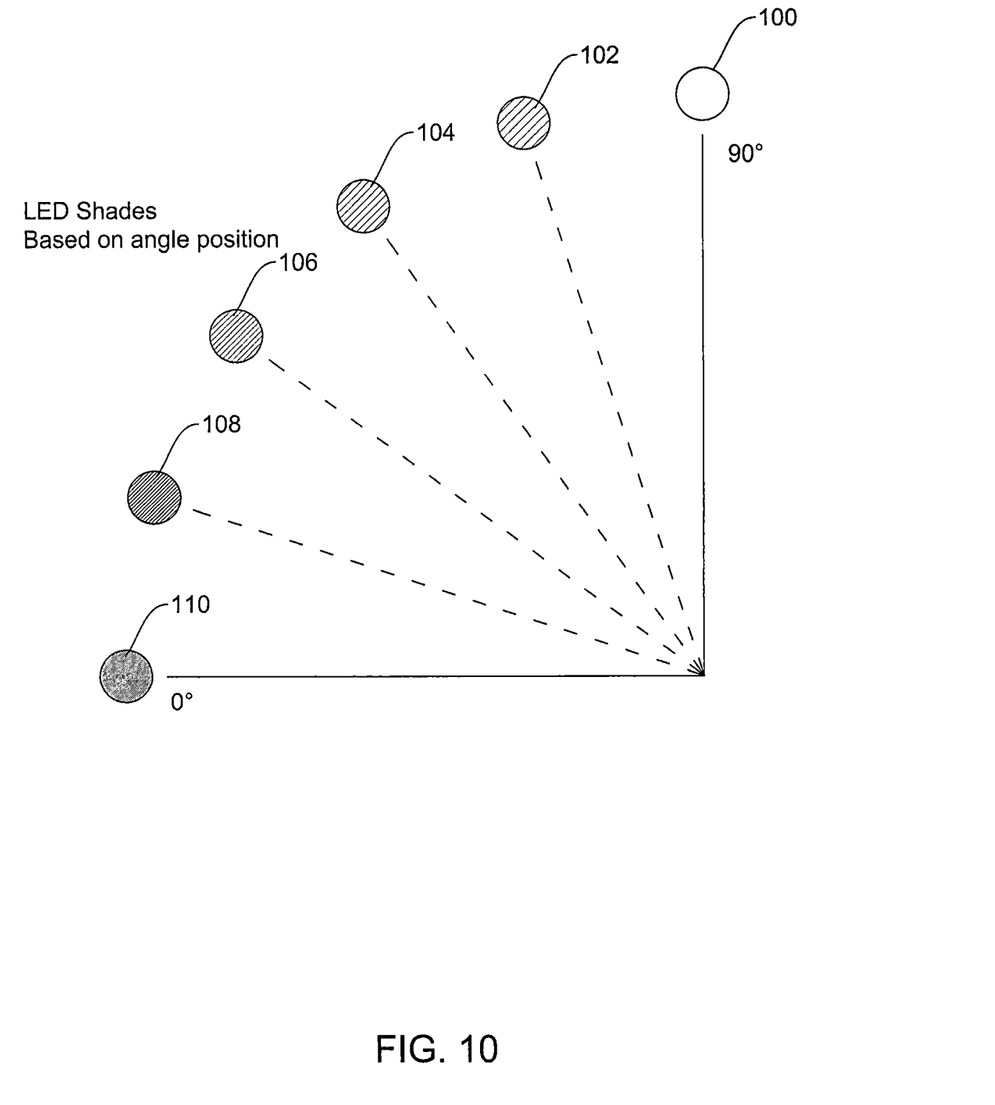
FIG. 10 is a schematic illustration depicting the transition in color when operating the improved illuminated level, in accordance with the present invention.

In operation, as shown best in conjunction with FIG. 10 the level 10 may be illuminated in a first color and/or first intensity when in a vertical, 90° orientation 100. In such an orientation the motion sensor 52 directs a signal, through the microprocessor 54, to the LED bulbs 50 to create this first illumination. As the level 10 changes its orientation, indicated by the changing colors 102 through 110, the illumination color and/or intensity may gradually change. When the level 10 reaches a horizontal 0° orientation, the LED bulbs 50 will illuminate a different color 110. It must be noted that any desired array of colors and/or intensities 102 through 108 may be utilized in combination with the level 10.

Additionally, the level 10 further includes a traditional operation to provide further visual indication of leveling. Further still, the inclusion of other ergonomic features, such as an over molded rubber bumper or a laser pointer function may further be incorporated in combination without interfering with the core functionalities as intended.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as is suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar caselaw or subsequent precedent should not be made if any future claims are added or amended subsequent to this Patent Application.

What is claimed is:

1. A level comprising:
    a linearly elongated translucent or partially translucent housing containing a power source in communication with an accelerometer and a microprocessor;
    at least one orientation indicator element mounted within the housing formed of a tubular transparent or translucent vial filled with a liquid to create a bubble;
    a plurality of light-emitting diode (LED) bulbs mounted within the housing and operationally controlled by the microprocessor to provide variation in color and/or intensity of illumination of the at least partially translucent housing as an indication of position of the level, said plurality of LED bulbs controlled by the microprocessor based on a orientation of the accelerometer.

2. A method of indicating the position of the level of claim 1, comprising:
    illuminating the plurality of light-emitting diode bulbs in a first color in a vertical orientation; and
    illuminating the plurality of light-emitting diode bulbs in a second color in a horizontal orientation.

3. The method of claim 2, further comprising:
    gradually changing a color and/or the intensity of the plurality of light-emitting diode bulbs during a transition of the orientation between the vertical orientation and the horizontal orientation.

4. The method of claim 2, further comprising:
    strobing the plurality of light-emitting diode bulbs during a transition of the orientation between the vertical orientation and the horizontal orientation.

5. The level of claim 1, wherein the liquid further comprises a colorant.

6. The level of claim 1, wherein the housing is of a form factor selected from a group consisting of: a carpenter's level; and a torpedo level.

7. The level of claim 1, wherein the at least one orientation indicator comprises a horizontal level indicator and further comprising:
    an angular orientation indicator positioned at a designated angle to the elongated centerline of the housing.

8. The level of claim 7, wherein the at least one orientation indicator further comprises a vertical level indicator.

9. A spirit or bubble type level comprising:
    a housing, said housing being linearly elongated about a centerline and being at least partially translucent;
    at least one light-emitting diode (LED) disposed within the housing for illuminating the at least partially translucent portion of the housing;
    a vertical orientation indication assembly disposed near a first terminus of the housing;
    an angular orientation indication assembly disposed near a second terminus of the housing;
    a horizontal orientation indication assembly within the housing; and
    an angle sensing circuit electrically connected to a battery and a controlling the at least one LED indication to provide a first illumination at a vertical orientation, a second illumination at a horizontal orientation, and a third illumination at an identified angular orientation; said angle sensing circuit further comprising:
        an eccentric mass retained by a radial magnet within a rotational cavity formed within the housing;
        a pair of spacers retaining the eccentric mass and the radial magnet within the cavity in a manner that freely rotates; and
        a rotational hall effect sensor sensing a position of the eccentric mass;
    where a balancing of the eccentric mass over top of the rotational Hall sensing sensor provides incremental outputs, serially, intervals of a desired incremental output.

10. The spirit or bubble type level of claim 9, wherein:
    said first illumination is select from a group consisting of: a first color; a first intensity; a first strobing; or a combination of two or more thereof; and
    said second illumination is select from a group consisting of: a second color; a second intensity; a second strobing; or a combination of two or more thereof.

11. The spirit or bubble type level of claim 9, wherein:
    said first illumination is select from a group consisting of: a first color; a first intensity; a first strobing; or a combination of two or more thereof; and
    said second illumination is select from a group consisting of: a second color; a second intensity; a second strobing; or a combination of two or more thereof.

12. The spirit or bubble type level of claim 10, wherein:
    said third illumination is select from a group consisting of: a third color; a third intensity; a third strobing; or a combination of two or more thereof.

13. The spirit or bubble type level of claim 11, wherein:
    said third illumination is select from a group consisting of: a third color; a third intensity; a third strobing; or a combination of two or more thereof.

14. A spirit level comprising:
    an at least partially translucent housing;
    at least one light-emitting diode (LED) disposed within the housing for illuminating the at least partially translucent housing;

at least one orientation indication assembly comprising a bubble suspended in a spirt and said at least one orientation indication assembly mounted within the housing;

an angle sensing circuit contained within the housing and electrically connected to a battery and controlling the at least one LED to illuminate the at least partially translucent housing based on an angular orientation and position of the level.

15. The spirit level of claim 14, wherein said illuminating the at least partially translucent housing comprises:

a first illumination selected from a group consisting of: a first color; a first intensity; a first strobing; or a combination of two or more thereof.

16. The spirit level of claim 15, wherein said illuminating the at least partially translucent housing further comprises:

a second illumination selected from a group consisting of: a second color; a second intensity; a second strobing; or a combination of two or more thereof.

17. The spirit level of claim 16, wherein said illuminating the at least partially translucent housing further comprises:

a third illumination selected from a group consisting of: a third color; a third intensity; a third strobing; or a combination of two or more thereof.

18. The spirit level of claim 14, wherein the housing is of a form factor selected from a group consisting of: a carpenter's level; and a torpedo level.

19. The spirit level of claim 14, wherein the at least one identified angular orientation is selected from a group consisting of: vertical; horizontal; and 45 degrees from horizontal.

20. The spirit level of claim 14, wherein the at least one identified angular orientation comprises more than one angular orientation selected from a group consisting of: vertical; horizontal; and 45 degrees from horizontal.

* * * * *